United States Patent
Richards et al.

(10) Patent No.: US 7,442,353 B1
(45) Date of Patent: Oct. 28, 2008

(54) HEAT RECIRCULATING COOLER FOR FLUID STREAM POLLUTANT REMOVAL

(75) Inventors: George A. Richards, Morgantown, WV (US); David A. Berry, Morgantown, WV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 425 days.

(21) Appl. No.: 10/969,607

(22) Filed: Oct. 21, 2004

(51) Int. Cl.
- B01D 53/00 (2006.01)
- B01D 53/48 (2006.01)
- B01J 19/00 (2006.01)
- C02F 1/00 (2006.01)
- F28F 99/00 (2006.01)

(52) U.S. Cl. .......... 423/210; 423/215.5; 423/220; 423/237; 423/242.1; 210/175; 210/176; 210/749; 210/757; 210/758; 210/902; 210/903; 210/914; 210/916; 165/61; 165/66

(58) Field of Classification Search .......... 423/210, 423/220, 237, 242.1, 215.5; 210/749, 757, 210/758, 175, 176, 903, 902, 914, 916; 165/61, 165/66
See application file for complete search history.

(56) References Cited

U.S. PATENT DOCUMENTS

| | | | | |
|---|---|---|---|---|
| 3,629,075 A | * | 12/1971 | Gutbier | 203/1 |
| 4,044,820 A | * | 8/1977 | Nobles | 165/66 |
| 4,637,918 A | * | 1/1987 | Osman et al. | 422/148 |
| 4,789,527 A | * | 12/1988 | Osman et al. | 422/148 |
| 4,877,519 A | * | 10/1989 | Robey | 210/86 |

* cited by examiner

Primary Examiner—Timothy C Vanoy
(74) Attorney, Agent, or Firm—Mark LaMarre; Mark P. Dvorscak; Paul A. Gottlieb

(57) ABSTRACT

A process by which heat is removed from a reactant fluid to reach the operating temperature of a known pollutant removal method and said heat is recirculated to raise the temperature of the product fluid. The process can be utilized whenever an intermediate step reaction requires a lower reaction temperature than the prior and next steps. The benefits of a heat-recirculating cooler include the ability to use known pollutant removal methods and increased thermal efficiency of the system.

10 Claims, 7 Drawing Sheets

DIFFERENTIAL ELEMENT FOR HEAT BALANCE

TEMPERATURE SLOPES FOR VARIOUS GASES OVER A RANGE OF TEMPERATURES.
INPUT PARAMETERS ARE LISTED IN TABLE 1.

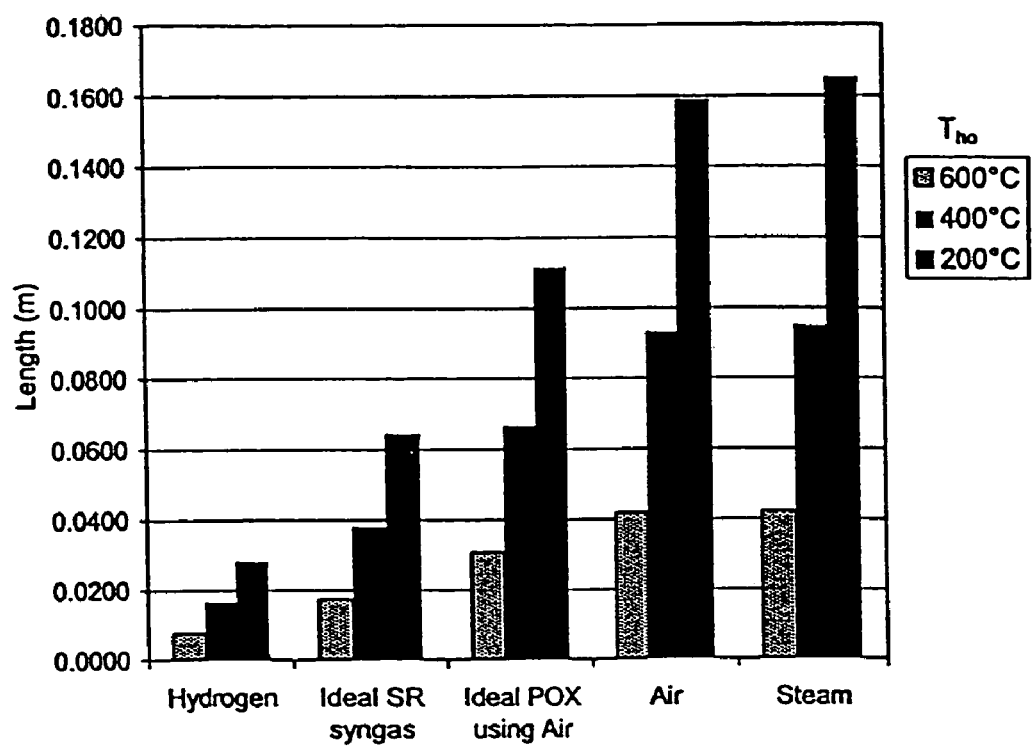
FIG. 5 Calculated heat exchanger length for different gases, and temperature drops. $\Delta T_l = 50°C$, $V_{hl} = 2.5$ m/s.

HEAT RECIRCULATING COOLER FOR FLUID STREAM POLLUTANT REMOVAL

CONTRACTUAL ORIGIN OF THE INVENTION

The United States Government has rights in this invention through an employer-employee relationship and agreements between the U.S. Government and the inventors.

BACKGROUND OF THE INVENTION

1. Field of the Invention

The invention relates to a process of lowering the temperature of a gas stream to perform an intermediate step and then raising the temperature of the resultant gas stream. More specifically, this invention relates to recirculating the heat removed from the reactant gas stream to be used to increase the temperature of the product gas stream, thus minimizing the amount of heat rejected from the system and increasing the overall efficiency of the system.

2. Background of the Invention

Fuel cells generate power by facilitating the movement of charged species across electrical gradients. The source of these charge carriers can be hydrogen gas, or conventional hydrocarbon feedstocks reformed to hydrogen ($H_2$) and carbon monoxide (CO) synthesis gas.

Fuel processing is an essential component of fuel cell systems that use conventional hydrocarbons. For solid oxide fuel cells (SOFCs), operating temperatures range between approximately 800° C. and 1000° C. Within this temperature range, heat from the fuel cell exhaust can be readily used to reform hydrocarbons to syngas ($H_2$+CO).

Fuel cell systems utilizing fuel reformers require sulfur removal as part of their fuel processing, as none of the systems tolerate appreciable levels of sulfur in the fuel gas. There are two broad approaches to removing the sulfur from the hydrocarbon fuel supply: remove it before reforming the fuel, or remove it from the syngas produced by reforming. If utilized before conversion to syngas, the method must remove any sulfur form present in the feedstock. One technique uses hydrotreatment to convert the various sulfur compounds into hydrogen sulfide ($H_2S$) for subsequent removal prior to reforming.

If the sulfur is removed after reforming, the sulfur will already be in the form of hydrogen sulfide.

Techniques to remove hydrogen sulfide are well established for temperatures between approximately 200° C. and 400° C. But these temperatures are much lower than the above stated 800-1000° C. temperatures used for fuel processing and fuel cell operation. This disparity presents a dilemma for thermal integration of fuel cell systems.

There are currently no known methods to remove $H_2S$ from syngas to desired levels of less than 1 ppmv (part per million by volume) at fuel cell operating temperatures without losing large quantities of heat from the system. Rejected heat penalizes the system efficiency; therefore, it must be minimized.

Heat-recirculating concepts have been applied to the opposite thermal problem of adding thermal energy to heat-recirculating combustion burners. In heat-recirculating burners, super-adiabatic temperatures are produced to allow the combustion of low-heating value fuels, enabling combustion to occur with a minimal amount of heat addition. A description of how heat recirculation, without mixing of products and reactants, could be used to burn mixtures of fuels having very low heating values was presented in: Lloyd, S. A., and Weinberg, F. J., "A Burner for Mixtures of Very Low Heat Content," *Nature*, Vol. 251, 47-49 (1974). S. A. Lloyd, and F. J. Weinberg, "Limits to Energy Release and Utilisation from Chemical Fuels," *Nature*, 257, 367-70 (1975).

Microscale burners, constructed in two-dimensional or three-dimensional "Swiss Roll" configurations, utilize heat recirculation to achieve sustainable combustion via super-adiabatic temperatures. This is shown in L. Sitzki, K. Borer, E. Schuster, and P. D. Ronney, "Combustion in Microscale Heat-Recirculating Burners," *The Third Asia-Pacific Conference on Combustion*, Jun. 24-27, 2001.

A need exists in the art for a method to remove sulfur compounds from fuel cell syngas to the desired levels (<~1 ppmv) without rejecting appreciable quantities of thermal energy. The method should lower the gas temperature in reformed gas to enable conventional sulfur removal in fuel cell operation while rejecting as little heat as possible. Also, the method should be simple to implement, requiring only rudimentary material and training.

SUMMARY OF THE INVENTION

An object of the present invention is to provide a process by which sulfur compounds may be removed from high temperature gas streams that overcomes many of the disadvantages of the prior art.

Another object of the present invention is to provide a device for regulating intermediate reaction step temperatures. A feature of the invention is fluid communication between a reaction chamber and a remote location via a plurality of conduits. Another feature of the invention is that the conduits are positioned so as to allow for thermal transfer (i.e., heat exchange) between fluids contained in different conduits. An advantage of the invention is that thermal transfer re-circulates heat and thus decreases the net heat lost in performing the intermediate reaction step.

It is another object of the present invention to provide a more efficient removal system for sulfur compounds from a high temperature fluid. A feature of the invention is that the temperature of the fluid is lowered to allow use of currently known methods of sulfur removal. An advantage of the invention is that the invention improves removal system efficiency without incurring the costs of developing new high-temperature sorbents.

Still another object of the present invention is to provide a process of lowering and then raising the temperature of a fluid with less heat rejection from the entire system. A feature of the invention is that the heat removed from the reactant fluid is re-circulated to supply heat to the product fluid. An advantage of the invention is that less additional heat is required to raise the temperature of the product fluid, thereby increasing overall system efficiency.

Briefly, the invention provides a device for regulating intermediate reaction step temperatures, the device comprising a reaction chamber; a plurality of conduits in close spatial relationship to said reaction chamber, wherein a first of said conduits having a first end positioned in close spatial relationship to a means of ingress, a second of said conduits having a first end positioned in close spatial relationship to a means of egress, and each of said conduits having a second end terminating at said reaction chamber; and heat exchange substrates intermediate said conduits.

The invention also provides a process for performing an intermediate reaction step on a reactant fluid at a lower temperature than the prior and next steps, the process comprising passing a reactant fluid through a first conduit and into a reaction chamber, whereby heat is removed from the reactant fluid as the reactant fluid passes through the first conduit; lowering the temperature of the reactant fluid; performing the intermediate step on the reactant fluid in the reaction chamber to create a product fluid; passing the product fluid out of the reaction chamber and through a second conduit which is in fluid communication with the reaction chamber; and heating the product fluid as the product fluid passes through the second conduit.

BRIEF DESCRIPTION OF THE DRAWINGS

The invention together with the above and other objects and advantages will be best understood from the following detailed description of the preferred embodiment of the invention shown in the accompanying drawings, wherein:

FIG. 5 depicts exemplary calculated heat exchanger lengths for various gases over an exemplary temperature drop of $\Delta T=50°$ C.

DETAILED DESCRIPTION OF THE INVENTION

Figure 1:
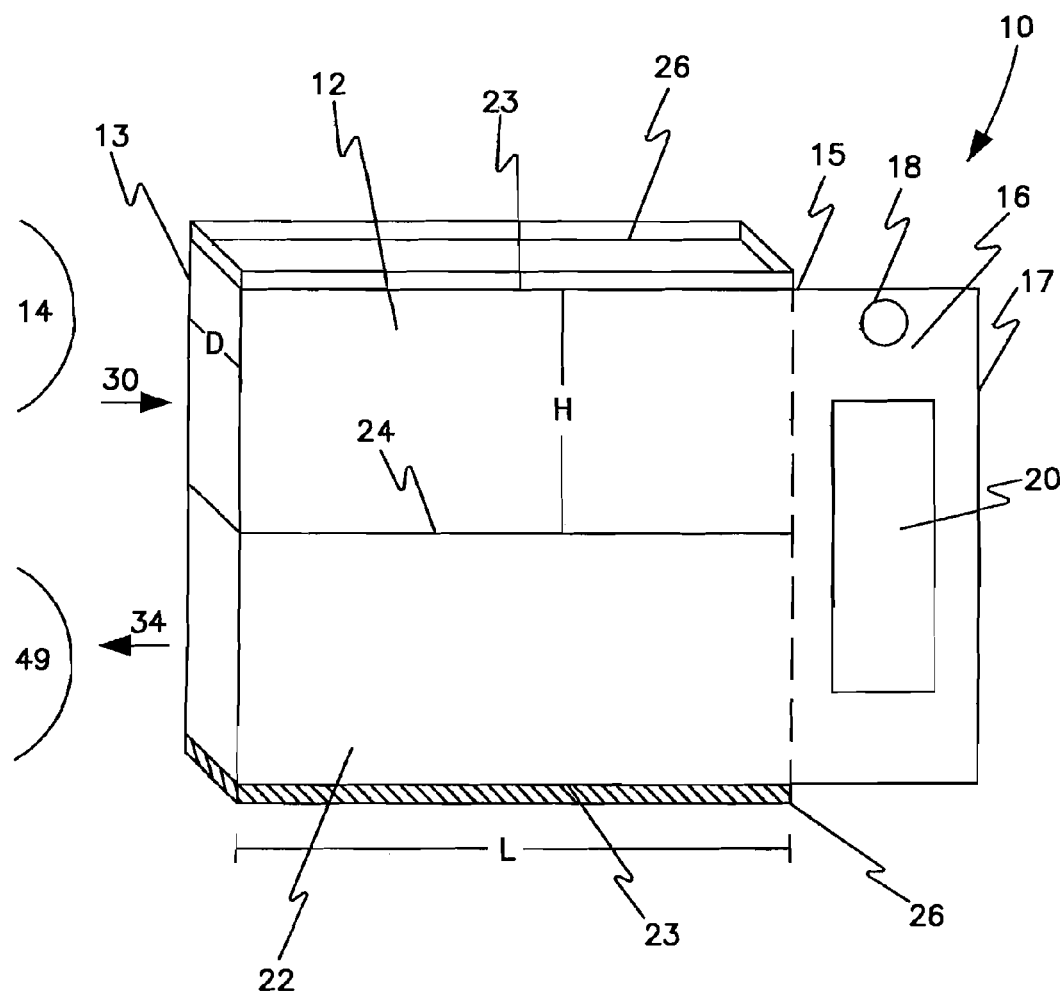
FIG. 1 depicts a device for regulating intermediate reaction step temperatures, in accordance with features of the present invention.

The inventors have developed a process to facilitate sulfur extraction from high temperature fluids while maintaining thermal efficiency. Generally, the present invention lowers the temperature of a fluid, removes sulfur, and then heats the fluid back up while losing as little thermal energy as possible to the environment. Specifically, the inventors have developed a process by which heat is removed from a reactant fluid to reach the operating temperature of a known sulfur removal method and said heat is recirculated to raise the temperature of the product fluid. In essence, the same fluid (i.e., reactant fluid being physically contiguous with product fluid) is circulated on both sides of a heat transfer membrane.

The invented process can be utilized whenever an intermediate step reaction requires a lower reaction temperature than the prior and next steps. Appropriate fluid streams that may be utilized include any single component fluid, any multi-component fluid, any single-phase fluid or any multi-phase fluid, including gas-solid mixtures. Additional exemplary applications of the invention include removal of other pollutants such as mercury, ammonia, COS, alkali, and some particulates from fluid. The temperature range of the fluid is limited only by the properties of the fluid components and the materials which comprise the invented device. The device may also be used to conduct a similar process at very low temperatures as well as the exemplary temperatures.

The benefits of a heat-recirculating cooler include the ability to use sulfur removal methods that already exist in the art. The process lowers the temperature of the fluid long enough to remove the sulfur compounds and then raises the temperature to nearly the starting temperature with as little heat rejection as possible. Thus, thermal energy efficiency is enhanced. Also, use of said removal methods supercedes the need to develop new sorbents or high temperature applications of currently known methods.

The invented device provides an apparatus for regulating intermediate reaction step temperatures. Additionally, the invented process provides a method for performing intermediate reaction step at a lower temperature than the prior and next steps by removing heat from a reactant fluid passing through one conduit to the reaction chamber and recirculating said heat to a product fluid passing through a second conduit away from the reaction chamber. A feature of the device is a substrate positioned intermediate the first and second conduits, the substrate serving as a means for thermally conducting heat from the reactant fluid to the product fluid.

The invented process can be utilized on any fluid or gas streams which require an intermediate step to be performed at a lower temperature than the previous and next steps. The length of the conduits is approximately proportional to the pressure of the fluid stream. For a given fluid, the slope is proportional to the pressure. One needs to integrate the slope to obtain the conduit length.

The invented process can be utilized on fluid or gas streams that require sulfur emissions control. The gases to be treated may contain other pollutants which known removal reactions require lower temperatures than prior or next reaction steps for which this process may be utilized. Exemplary gas stream sources include fuel gases comprising syngases made from ideal steam reforming, ideal partial oxidation with air, autothermal reforming, or combinations thereof. These gas streams typically occur at temperatures in the range of between 600° C. and 1100° C. Also, gas streams mixed with air, steam, nitrogen, and other ambient fluids are suitable.

The invented process is capable of lowering the temperature from an initial temperature, $T_i$ (for example, 600° C.-1100° C.), to an intermediate temperature, $T_{mn}$ (for example, 200° C.-400° C.). The process produces temperature differences depending upon the length and flow rate in the conduits. Exemplary fuel cell systems operate at $T_i=800°$ C.-1000° C. with known sulfur removal methods taking place at $T_{mn}=200°$ C.-400° C.; thus, in the examples illustrated below, the process allows for temperature differences of approximately 400° C.-600° C. The process can also be used for lower temperature gas streams (e.g., 200-600° C.) to perform an intermediate step reaction at, for example, near-ambient temperatures (i.e., 35-50° C.). It may be possible to utilize the invented process to perform reactions on fluid streams with intermediate step reactions at temperatures as low as −20-0° C.

The reactive pollutants in the fluid streams are sulfur compounds in the form of hydrogen sulfide, $H_2S$. Other possible pollutants that may be removed from gas streams via this process may include mercury (Hg), ammonia ($NH_3$), combinations thereof, and others.

Device Detail

An exemplary heat recirculating device is depicted schematically in FIG. 1 as numeral 10. The device comprises a plurality of elongated conduits 12 and 22, generally tunnel shaped or tubular shaped. Each of the conduits has a first end 13 and a second end 15. Each of the first ends 13 of conduit 12 is positioned in a close spatial relationship with a remote location 14, and each of the first ends 13 of conduit 22 is positioned in a close spatial relationship with a remote location 49. Each of the second ends 15 is positioned in a close spatial relationship with a reaction chamber 16 to allow fluid communication between the second ends 15 and the reaction chamber through openings 19 and 21. The conduits are arranged so as to facilitate fluid communication between the remote location 14 from which a reactive gas emanates, the reaction chamber 16, the remote location 49 to which the product gas flows. Each of the conduits 12 and 22 defines a height H and diameter D which is determined based on the thermal conductivity of the fluid, the density of the fluid, the flow velocity of the fluid, the temperature difference ($T_i$-$T_{mn}$) needed to regulate the intermediate reaction step temperature, and an amount of heat rejection ($T_f$-$T_i$) to be tolerated. For later usage, the temperature difference is defined as $\Delta T = T_f - T_i$. $T_i$ is the initial temperature, $T_{mn}$ is the intermediate reaction step temperature, $T_f$ is the final temperature. The cross-sectional areas (H×D) of the conduits 12 and 22 need not be in a 1:1 ratio and may be established in whatever proportions to meet pressure, flow, and assembly requirements. Another configuration not depicted here allows for exemplary conduits 12 and 22 to be positioned so that the conduit 12 is positioned within, and co-axial to, the conduit 22 forming an annular space between the substrate 24 and exterior surface 23.

The conduits 12 and 22 are separated by a substrate 24. The substrate preferably is nonporous to the molecular species contained in the fluid stream to be treated. Generally, the longitudinally extending substrate defines an internal or a common wall for both the first conduit and the second conduit and situated immediate thereto. As such, the substrate extends along a substantial portion of the elongated surface of the conduits and in a direction parallel to the longitudinal axis of the conduits. This configuration maximizes heat transfer between the conduits. The conduits 12 and 22 are confined to a housing so as to facilitate the formation and maintenance of a controlled atmosphere and also to thermally insulate the device 10. The housing is further defined by exterior, longitudinally extending surfaces 23, which preferably are adiabatic. Additional thermal insulation 26, contacting the exterior surfaces 23, aids to prevent further heat loss to the environment.

Figure 1B:
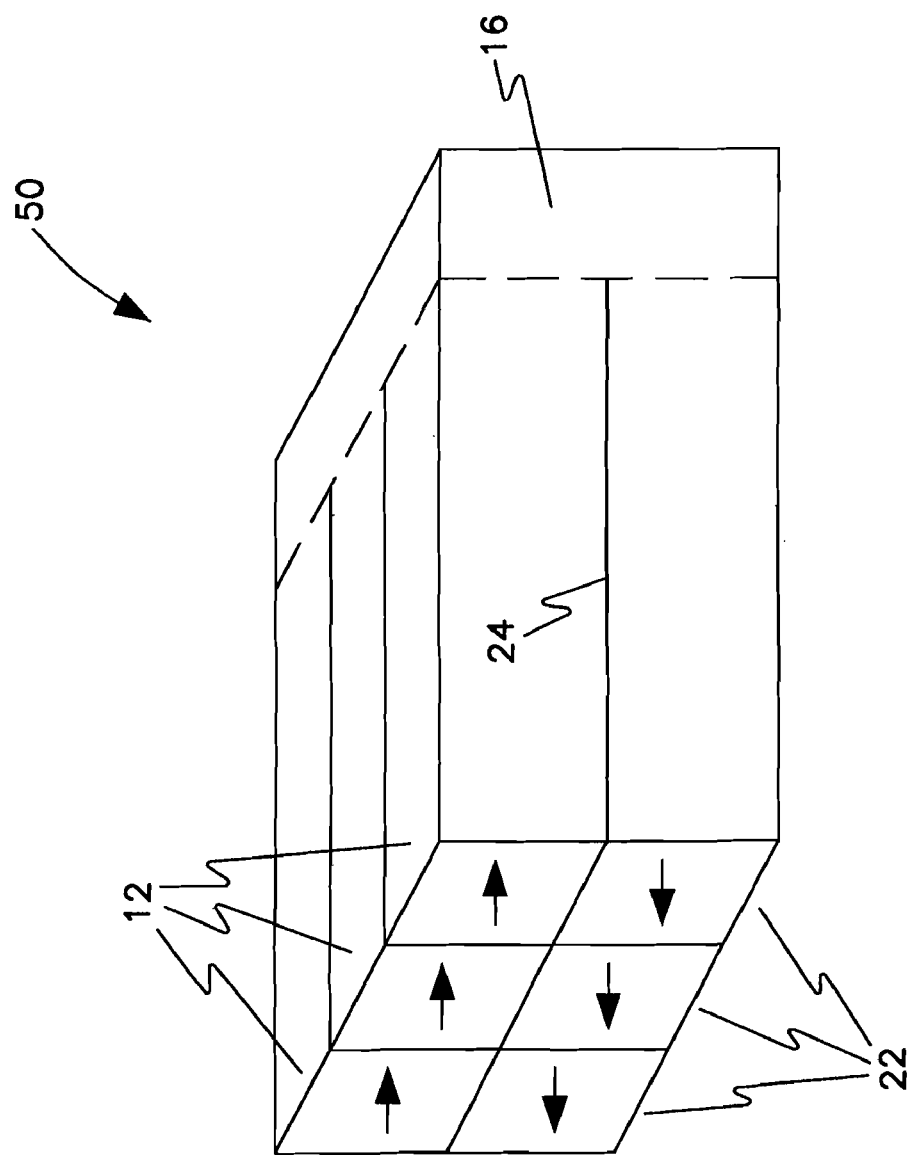
FIG. 1B depicts an exemplary stacked configuration of said device in accordance with features of the present invention.

An exemplary stacked configuration of the invented device is depicted schematically in FIG. 1B as numeral 50. The conduits 12 and 22 may be stacked so that the in-flow conduits 12 are parallel to the out-flow conduits 22. The in-flow conduits 12 form a substantially smooth continuous surface, and the out-flow conduits 22 form another substantially smooth continuous surface. In one embodiment, the stacked conduits 12 and 22 are in fluid communication with one common reaction chamber 16. Other exemplary embodiments may incorporate multiple reaction chambers 16 in a stacked configuration. No insulation is required between conduits, thereby allowing heat exchange between the reactant stream compartments and the product stream compartments.

Figure 1C:
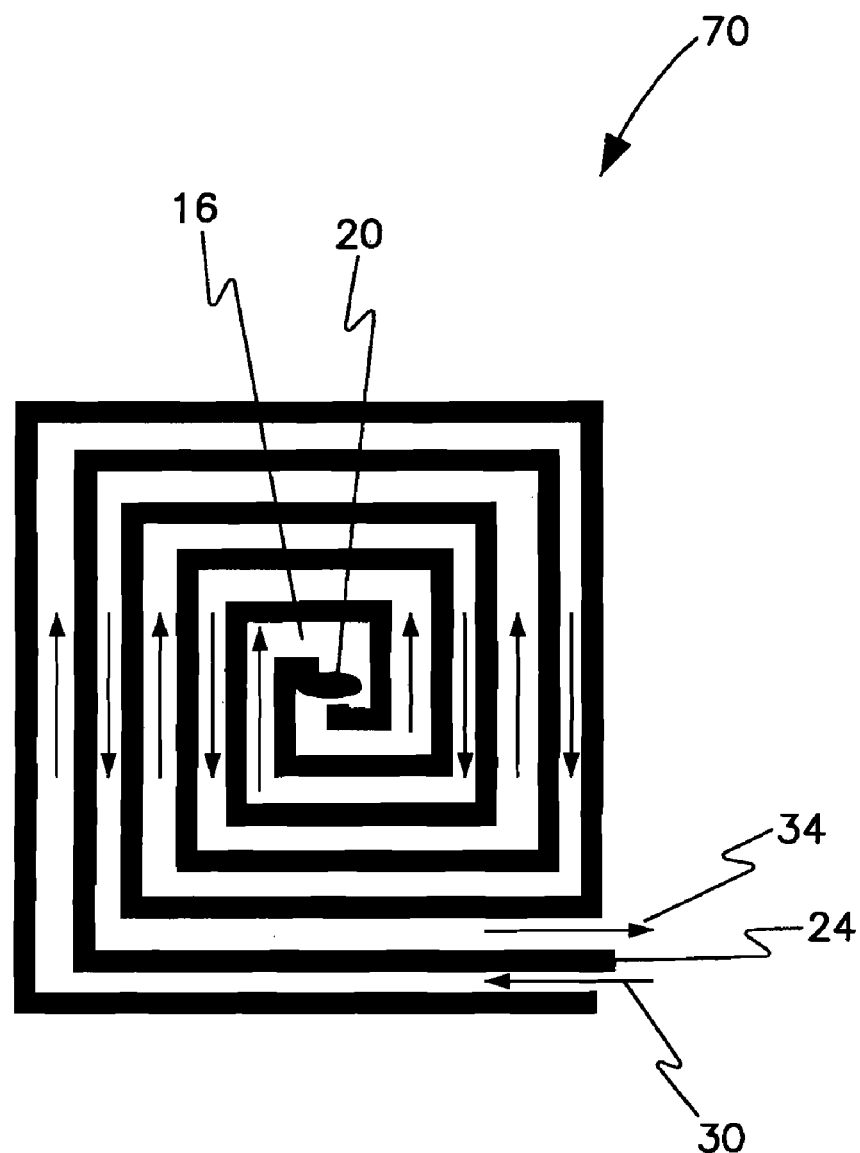
FIG. 1C depicts an exemplary "Swiss Roll" configuration of said device in accordance with features of the present invention.

In another device configuration, the conduits 12 and 22 may be folded to reduce the space required to house the invention. An exemplary configuration is a "Swiss Roll" configuration as depicted as numeral 70 in FIG. 1C. A two-dimensional Swiss Roll device comprises a linearly extruded spiral shape, and a three-dimensional Swiss Roll device comprises the two-dimensional spiral extruded in a circular pattern to create a toroidal geometry. Other geometrical configurations of a Swiss Roll device, such as a two-dimensional square shape and a three-dimensional cube, are also possible embodiments. In addition to reducing the space required for the device, the Swiss Roll configuration also incorporates the advantages of the stacked configuration. The chemical process would occur in the middle of the roll, with the product returning along the "out" conduit. Use of the Swiss Roll configuration will depend on requirements for the reaction to be performed in the reaction chamber 16.

The reaction chamber 16 is defined by an enclosure 17 or some type of housing adopted to control the temperature and environment of the intermediate reaction. The reaction chamber enclosure 17 contains a means for rejecting heat 18 from the reaction chamber, with exemplary means comprising cooling fins. The reaction chamber 16 contains a means for confining intermediate reaction step reagents 20 in the enclosure 17. The reagents are presented as a stationary sorbent bed, a monolith, a fluidized bed, or a reaction film painted on the inside surface of the chamber 16. In the situation where the conduits 12 and 22 are stacked in multiple groupings, said conduits may be in fluid communication with a common reaction chamber 16.

Process Detail

Figure 2:
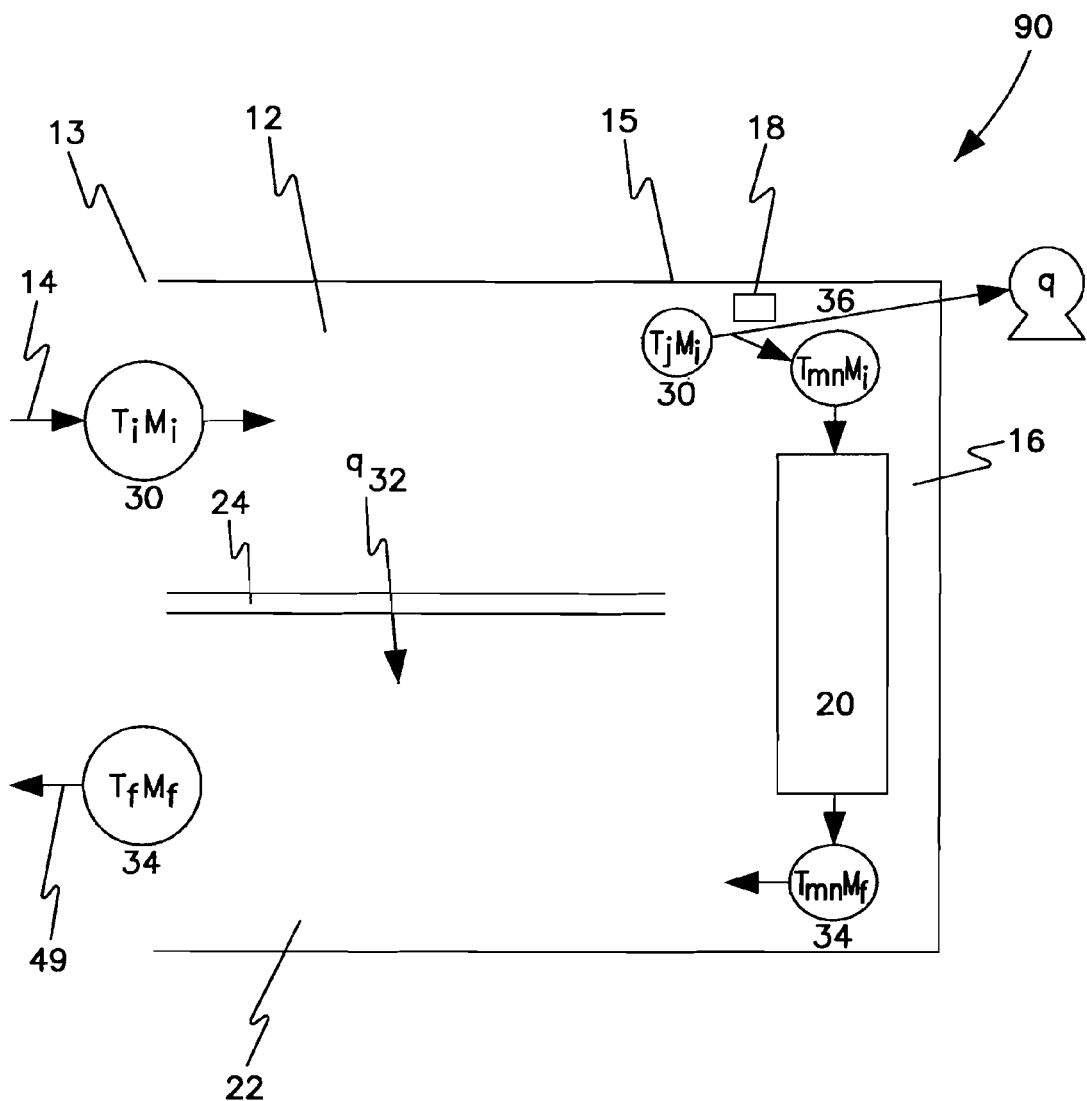
FIG. 2 depicts a heat recirculation process in accordance with features of the present invention.

The invented heat recirculation process is depicted as numeral 90 in FIG. 2. A reactant fluid 30, which contains a target pollutant such as hydrogen sulfide, is provided. The reactant fluid 30 enters the first conduit 12 and is progressively cooled as it passes through the conduit 12 to the reaction chamber 16. Heat 32 from the reactant fluid 30 radiates or otherwise passes through the substrate 24 via thermal conduction, and into a product fluid 34. Upon the reactant fluid 30 entering the reaction chamber 16 at a temperature $T_i$ additional heat 36 is rejected from the system by a means 18 to achieve an intermediate operating temperature, $T_{mn}$.

The reactant fluid 30 reacts with the means 20 to remove the target pollutant and create a product fluid 34. The product fluid 34 then leaves the reaction chamber 16 through the second conduit 22. The product fluid is progressively heated by heat 32 passing through the substrate 24 from the reactant fluid 30 to achieve a final temperature $T_f$. Ultimately, the product fluid 34 is released to a final egress point 49.

Heat Exchange Process Detail

Reactant fluid with temperature $T_i$ and mass $m_i$ enters the first conduit and progressively loses heat as it travels along the first conduit into the reaction chamber. The heat leaving the reactant fluid in the first conduit passes through a substrate which separates the conduits and enters the product fluid in the second conduit. Surfaces of said conduits are solid, nonporous, and do not allow physical exchange of fluids between the conduits. The substrate allows steady flow heat transfer and does not store heat. An exemplary substrate allows for the transfer of thermal energy with between 50 and 99 percent less resistance than that seen in convective heat transfer scenarios. Fluid enters the reaction chamber at temperature $T_j$.

In the reaction chamber, heat is rejected to reach the reaction temperature $T_{mn}$ via standard temperature reduction means. Such means include cooling fins, exhaust fans, condenser-type heat exchange surfaces, radiator fins, and combinations thereof. The temperature also may be lowered to $T_m$ via an endothermic reaction or an endothermic phase change of the fluid to remove heat from the chamber. Moreover, a combination of these two methods may be used to reach $T_{mn}$. The intermediate reaction temperature, $T_{mn}$, is determined by the operating temperature of the chosen removal method.

The intermediate reaction reagents are confined to the reaction chamber by means of sorbent beds, a reaction film painted on the inside surface of the chamber 16, or other methods. Sulfur compounds in the form of hydrogen sulfide in the reactant fluid are removed via known methods such as passing through a sorbent bed containing zinc oxide, various metal oxides, amine-based absorbents, or activated carbon; catalytic oxidation of hydrogen sulfide to elemental sulfur; passing the fluid through membranes; or other methods. Similarly, this process may be utilized to remove other pollutant compounds, such as mercury (Hg) or ammonia ($NH_3$), from the reactant fluid via known methods. The reagents are positioned within the reaction chamber as stated supra.

The now de-sulfurized product fluid of temperature $T_{mn}$ and mass $m_f$ leaves the reaction chamber by passing into the second conduit. As the product fluid travels through the second conduit, it is progressively heated by the addition of heat which has passed through the substrate from the reactant fluid in the first conduit. The product fluid leaves the device with a final temperature $T_f$.

Figure 3:
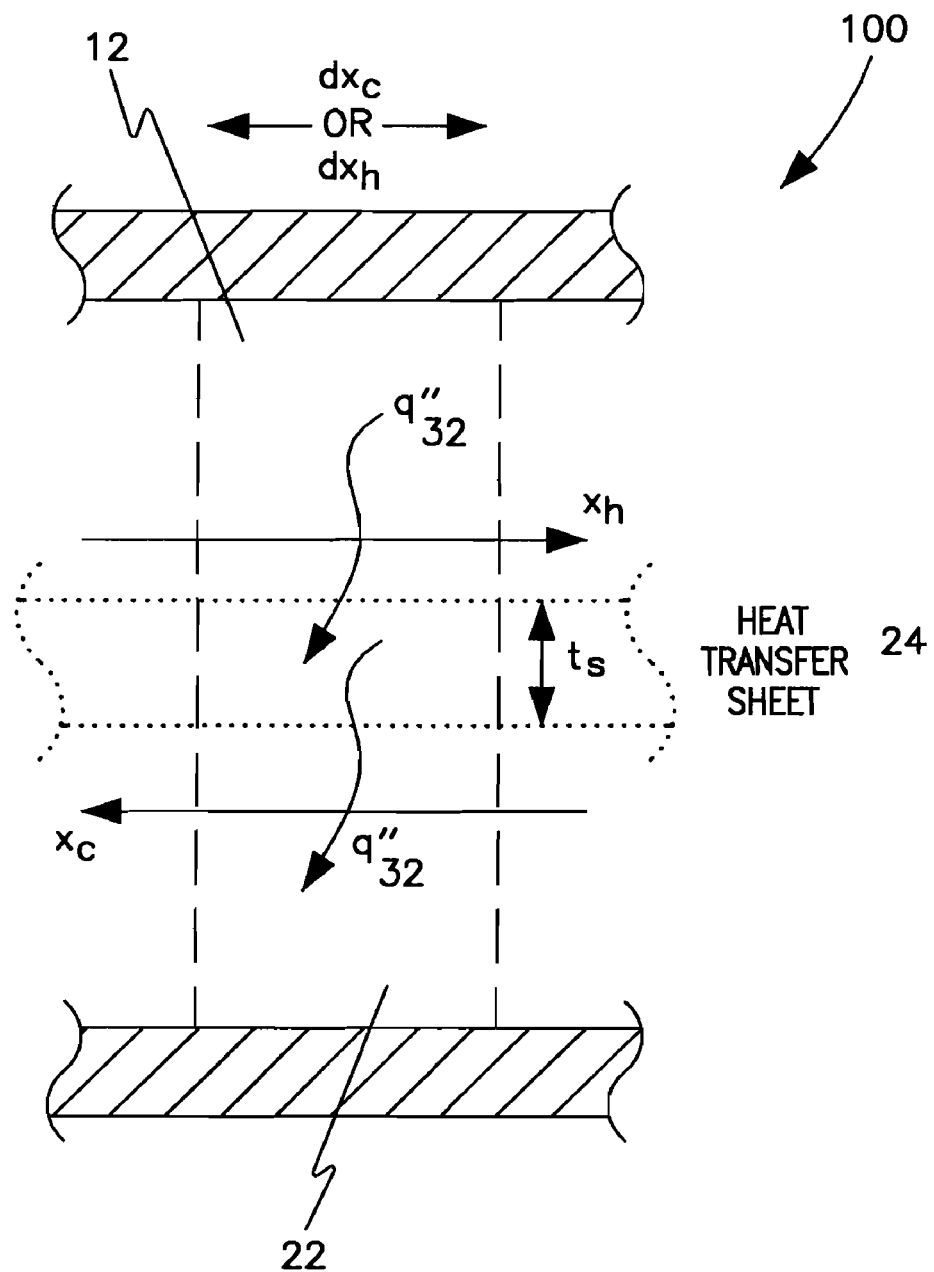
FIG. 3 depicts a differential element for heat balance in accordance with features of the present invention.

A differential element for heat balance is shown as numeral 100 in FIG. 3. The transfer of heat 32 from the reactant fluid 30 through the substrate 24 to the product fluid 34 is depicted along an incremental length of the conduits 12 and 22. The heat storage capacity of the substrate has no significance here, as this is a steady flow heat exchange device.

Heat balance analysis is similar to that utilized for treating counter-flow heat exchangers, as presented in F. P. Inropera, and D. P. DeWitt. *Fundamentals of Heat Transfer*, J. Wiley Pubis., 1981, incorporated herein by reference. A notable change is that the invention provides that a similar fluid physically contacts both sides of the heat transfer substrate.

The temperature slope can be expressed as change in temperature per change in length, $dT/dx$. At steady state, the heat flow per unit area, $q''$, is the same on both sides of the substrate. Temperatures of the reactant fluid conduit, the "hot" conduit, have the same slope as temperatures of the product fluid conduit, the "cold" conduit. The mass flow through the conduits can be expressed as the product of density, $\rho_1$, velocity, $V_1$, specific heat capacity of the fluid at constant pressure, $C_p$, and conduit height H:

$$\frac{dT_1}{dx_1} = \frac{dT_2}{dx_2} = \frac{-U(\Delta T)}{(\rho_1)(V_1)HC_p} \quad (1)$$

The slope of the temperature can be calculated for the parameters on the right side of Equation (1). Magnitude of the slope of the temperature curve is maximized to achieve the shortest practical design for a given temperature reduction. The heat transfer coefficient U, as defined in standard textbooks, (Inropera and DeWitt 1981), is:

$$U = \frac{1}{\frac{1}{h_c} + \frac{t_s}{k_s} + \frac{1}{h_h}} \quad (2)$$

The 's' subscript denotes the substrate between the first conduit and the second conduit, $t_s$ is the thickness of the substrate, $k_s$ is the thermal conductivity of the substrate, and $h_c$ and $h_h$ are the respective cold and hot convection coefficients. The thickness of the substrate, $t_s$, is determined based upon the desired heat transfer coefficient of the substrate.

For turbulent flow, the convection coefficients will rise with the Reynolds number to a fractional power; therefore, increasing the flow velocity will raise the heat transfer coefficient until thermal conduction across the substrate becomes a limiting factor. For laminar flow in the conduits, the convection coefficients are independent of the flow rate. The implication is that the greatest slopes can be achieved by using the smallest practical velocity in Equation (1).

Equation (1) is integrated over a desired temperature range to determine the required length of the first and second conduits. This calculation is made for each specific fluid to be treated.

The final temperature, $T_f$, of the product fluid is dependent on the flow rate, length of conduit, and the amount of heat rejection to be tolerated.

EXAMPLES

Calculations relevant to reforming heavy hydrocarbons were made using an input fuel approximated as $CH_{1.75}$. Gas compositions of ideal steam reforming and ideal partial oxidation (POX) with air are considered with the following stoichiometries:

Ideal steam reforming: $CH_{1.75} + H_2O \rightarrow 1.875H_2 + CO_2$

Ideal POX with air: $CH_{1.75} + 1;2(O_2 + 3.76N_2) \rightarrow + 0.88H_2 + CO + 1.88N_2$ In addition to the gas compositions produced by the reforming processes above, calculations have been carried out for pure hydrogen, pure steam, and air. The various gas compositions and other parameters are summarized in TABLE 1, infra. The flow velocity at the first conduit entrance is chosen to be 2.5 m/s, which is typical of the range of velocities found in fuel cell systems. The flow velocity can be chosen as a design parameter in Equation (1), and has been investigated over the range 0.01 to 10 m/s. Empirically, the choice of flow velocity would be determined based on packaging and pressure-drop requirements.

TABLE 1

List of Experimental Gas Compositions and Other Parameters[a]

| Reforming Atmosphere | $H_2$ | CO | $H_2O$ | $N_2$ | $CO_2$ | Air |
|---|---|---|---|---|---|---|
| Ideal Steam Reforming | 0.65 | 0 | 0 | 0 | 0.35 | 0 |
| Ideal POX Reforming with Air | 0.23 | 0.27 | 0 | 0.5 | 0 | 0 |
| Pure Hydrogen | 1 | 0 | 0 | 0 | 0 | 0 |
| Air | 0 | 0 | 0 | 0 | 0 | 1 |
| Steam | 0 | 0 | 1 | 0 | 0 | 0 |

[a]Conditions were:
1) Hot inlet velocity, $V_1$: 2.5 m/s
2) Operating pressure: 101 kPa
3) Channel height, H: 1 mm
4) Substrate thickness, $t_s$: 0.79 mm, 304 Stainless Steel
5) Temperature drop ($\Delta T = T_i - T_f$): 50° C. (temperature drop from heat rejection)

Figure 4:
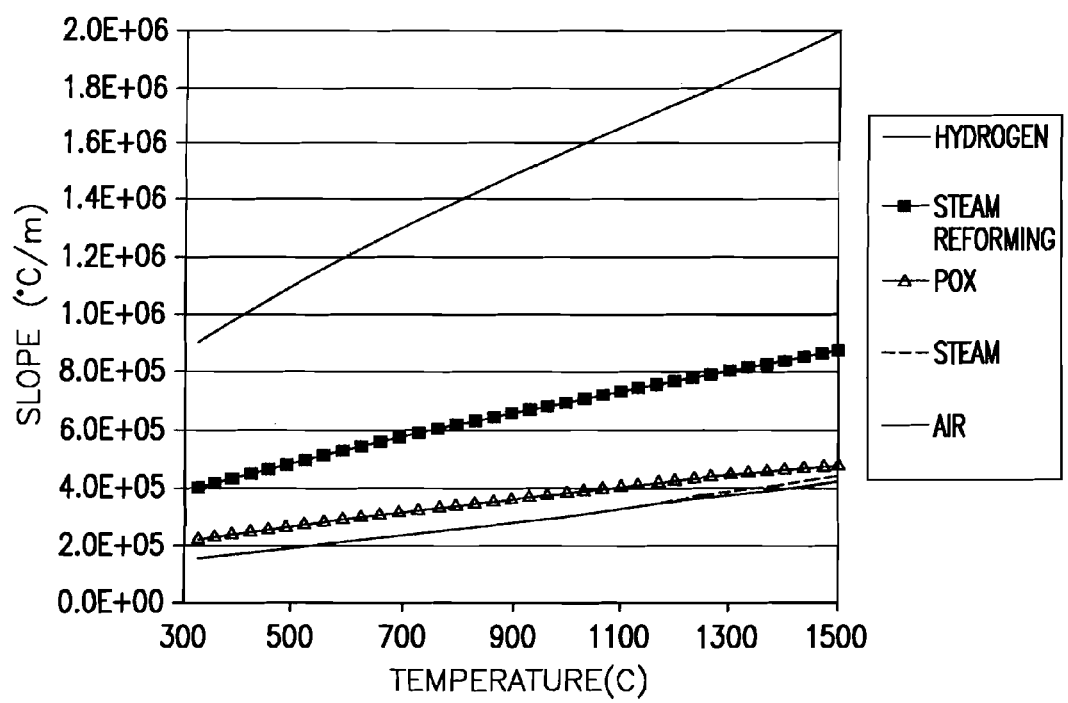
FIG. 4 depicts a series of temperature slopes calculated for various gases over a range of temperatures in accordance to parameters set forth in TABLE 1 of the present invention.

Using the above conditions, the temperature slope was calculated over a range of temperatures from 300° C. to 1500° C. The results of the temperature slope calculations are shown in FIG. 4. The calculated heat exchanger lengths for the different gas compositions identified supra are shown in FIG. 5. The table shows the lengths for each gas composition under two different exemplary temperature differentials: 800° C. to 400° C. and 800° C. to 200° C. However, the invented process is not limited to the exemplary temperature ranges and may operate at any temperature differential, as chosen for Equation (1) parameters. Thus, performance may be evaluated at any temperature range.

While the invention has been described with reference to details of the illustrated embodiment, these details are not intended to limit the scope of the invention as defined in the appended claims.

The embodiment of the invention in which an exclusive property or privilege is claimed is defined as follows:

1. A process for performing an intermediate reaction process on a fluid at a lower temperature than the prior and next steps, the process comprising:
   a) providing a first conduit and a second conduit adjacent to the first conduit, wherein the first conduit and the second conduit are separated by a substrate which is common to both the first conduit and the second conduit and permits the transfer of heat between the first conduit and the second conduit;
   b) passing the fluid through a first conduit and into a reaction chamber, whereby heat is removed from the reactant fluid as the reactant fluid passes through the first conduit and the heat is transferred through the substrate to the second conduit;
   c) lowering the temperature of the reactant fluid;
   d) performing the intermediate reaction with the reactant fluid in the reaction chamber to create a product fluid;
   e) passing the product fluid out of the reaction chamber and through a second conduit in fluid communication with the reaction chamber; and
   f) applying heat transferred from the reactant fluid in the first conduit through the substrate to the product fluid as the product fluid passes through the second conduit, wherein the first conduit is positioned adjacent to the second conduit with a substrate intermediate the conduits.

2. The process as recited in claim 1 wherein the temperature of the reactant fluid is lowered by expelling heat from the reaction chamber.

3. The process as recited in claim 1 wherein the temperature of the reactant fluid is lowered by utilizing heat from the reactant fluid to facilitate an endothermic reaction or an endothermic phase change.

4. The process as recited in claim 1 wherein the reactant fluid is at an initial temperature $T_i$ entering the first conduit and is progressively cooled to an intermediate temperature $T_{mn}$ by heat exchange through a common substrate with the second conduit at which said reactant fluid undergoes the intermediate reaction in the reaction chamber and the product fluid exits the reaction chamber in the second conduit.

5. The process as recited in claim 4 wherein the product fluid at an intermediate temperature $T_{mn}$ exiting the reaction chamber via the second conduit is progressively heated to a final temperature $T_f$ by application of heat progressively removed from the reactant fluid entering the reaction chamber through the first conduit.

6. The process as recited in claim 1 wherein the first conduit is positioned within, and co-axial to, the second conduit so as to form an annular space between surfaces comprising the first conduit and the second conduit.

7. The process as recited in claim 1 where the intermediate reaction is the removal of pollutants from the reactant fluid by known removal means.

8. The process as recited in claim 7 wherein the known removal means are confined to the reaction chamber by means selected from a group consisting of stationary sorbent beds, monoliths, fluidized beds, a reaction film on the surface of the reaction chamber, and combinations thereof.

9. The process as recited in claim 1 wherein the intermediate reaction is the removal of sulfur compounds from the reactant fluid.

10. The process as recited in claim 1 wherein the intermediate reaction has an operating temperature, $T_{mn}$, selected from between −20° C. and 1500° C.

* * * * *